(12) United States Patent
Stolper

(10) Patent No.: US 10,719,070 B2
(45) Date of Patent: Jul. 21, 2020

(54) SYSTEM AND METHOD FOR MODELING SIGNAL FLOWS IN AUTOMATION TECHNOLOGY EQUIPMENT

(75) Inventor: Thilo Stolper, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1495 days.

(21) Appl. No.: 12/680,110

(22) PCT Filed: Sep. 25, 2007

(86) PCT No.: PCT/EP2007/008329
§ 371 (c)(1),
(2), (4) Date: Mar. 25, 2010

(87) PCT Pub. No.: WO2009/046726
PCT Pub. Date: Apr. 16, 2009

(65) Prior Publication Data
US 2010/0211361 A1     Aug. 19, 2010

(51) Int. Cl.
*G05B 19/418* (2006.01)
*G05B 19/042* (2006.01)

(52) U.S. Cl.
CPC ... *G05B 19/41885* (2013.01); *G05B 19/0426* (2013.01); *G05B 2219/23005* (2013.01);
(Continued)

(58) Field of Classification Search
USPC .......................................................... 703/6
See application file for complete search history.

(56) References Cited

U.S. PATENT DOCUMENTS 8,035,638 B2 *  10/2011  Pelletier-Doyle et al. ... 345/419
2002/0120362 A1 *  8/2002  Lathan .................... A63F 13/00
                                                    700/245

(Continued)

FOREIGN PATENT DOCUMENTS

DE          101 34 940         2/2003
DE       10 2004 019 432       11/2005
WO          WO 01/04748        1/2001

OTHER PUBLICATIONS

"3-D-Projektierung und Simulation von Ablaufsteuerungen", Werkstatttstechnik, Springer Verlag Berlin DE, vol. 90, No. 7-8, pp. 292-296, 2000.

*Primary Examiner* — Omar F Fernandez Rivas
*Assistant Examiner* — Bernard E Cothran
(74) *Attorney, Agent, or Firm* — Cozen O'Connor

(57) ABSTRACT

A system and method for generating a behavior model for simulating an automation system, wherein signal flows between components of the automation system are simulated. The system comprises a CAD application for developing CAD drawings of the components of the automation system, where the CAD application comprises first modules for defining a geometric scope of application for the data interfaces of the components, second modules for defining at least one signal transmission prerequisite, which marks at least one relative position of two scopes of application relative to each other, at which signal transmission is possible between associated data interfaces, third modules for verifying the compatibility of the data interfaces at which the signal transmission prerequisite is met, and fourth modules for generating the behavior model such that a signal flow between the data interfaces at which the signal transmission prerequisite and compatibility are met is modeled in the simulation.

16 Claims, 4 Drawing Sheets

(52) U.S. Cl.
CPC .............. *G05B 2219/23448* (2013.01); *G05B 2219/23456* (2013.01); *G05B 2219/32345* (2013.01); *G05B 2219/32351* (2013.01); *Y02P 90/26* (2015.11); *Y02P 90/265* (2015.11)

(56) References Cited

U.S. PATENT DOCUMENTS

| | | | | |
|---|---|---|---|---|
| 2004/0261944 | A1* | 12/2004 | Wakabayashi | B24B 37/345 156/345.12 |
| 2006/0112382 | A1* | 5/2006 | Glass et al. | 717/168 |
| 2008/0263628 | A1* | 10/2008 | Norman | G08C 17/02 726/1 |
| 2009/0089700 | A1* | 4/2009 | Gu | G05B 19/41885 715/771 |

* cited by examiner

SYSTEM AND METHOD FOR MODELING SIGNAL FLOWS IN AUTOMATION TECHNOLOGY EQUIPMENT

CROSS-REFERENCE TO RELATED APPLICATIONS

This is a U.S. national stage of International Application No. PCT/EP2007/008329, filed on 25 Sep. 2007.

BACKGROUND OF THE INVENTION

The invention relates to a system and method for generating a behavior model for the simulation of an automation system, in which signal flows between components of the automation system are simulated.

It is known to use a system or method for planning and designing systems for production and/or process automation. Known production-engineering equipment, however, is very complex and highly automated. The control software needed for controlling the components of this known equipment is likewise of considerable complexity. For an automation technology system to be put into operation smoothly, it is therefore desirable for the control software to be tested before placing the an automation system into operation. Simulations of the automation equipment are therefore nowadays increasingly performed in advance.

The simulations mentioned can be performed even when the components of the automation system which are implemented in hardware are not yet available. Here, a computer is used to simulate the behavior of the equipment components. The aim of this simulation is to furnish the control program, which is to be simulated, with appropriate input signals that are generated as a function of the output signals generated by the control program.

To control an automation program, programmable logic controllers (PLCs) are generally used. To a PLC, the environment is visible only in the form of input signals to which it responds, depending on the implemented control code, with corresponding output signals. In a real plant, the control program receives its input values from sensors and supplies output signals to actuators of the automation system.

An automation system can also be subdivided into many different components and units, between which data communication occur continuously during automated operation.

To simulate the automation system correctly, these signal flows have to be simulated by a suitable behavior model. Depending on the complexity and multiplicity of the components used in the automation system, the simulation of these signal flows is extremely complicated for the user and prone to errors.

In conventional simulation systems, the signal flows are implemented by allocating names for global variables or transmission parameters. The connections between the components communicating with each other can be modeled in a userface by graphic connecting lines or the entry of corresponding variable names at both ends. The more complex the structure of the automation system to be modeled, the more prone such an approach is to errors. In addition, the definition of signal flows in the form of graphic connecting lines frequently results in a highly unclear representation which makes locating errors extremely difficult.

SUMMARY OF THE INVENTION

It is therefore an object of the invention to facilitate for a user the modeling of signal flows within an automation system.

This and other objects and advantages are achieved in a system for generating a behavior model for the simulation of an automation system, where the system comprises: a CAD application for developing CAD drawings of components of the automation system, where the CAD application comprises first means for defining a geometric scope of application for data interfaces of the components and second means for the definition of at least one signal transmission prerequisite, which marks at least one relative position of two scopes of application relative to each other, at which signal transmission is possible between the associated data interfaces.

The system also includes third means for verifying the compatibility of data interfaces at which the signal transmission prerequisite is met, and fourth means for generating the behavior model such that a signal flow between the data interfaces at which the signal transmission prerequisite and compatibility are met is modeled in the simulation.

The object is also achieved in a method for generating a behavior model for the simulation of an automation system, comprising the following method steps of developing CAD drawings of components of the automation system in a CAD application, where the geometric scope of application is defined for data interfaces of the components by the CAD application, and defining at least one signal transmission prerequisite, which marks at least one relative position of two scopes of application relative to each other, at which signal transmission is possible between the associated data interfaces.

The method also comprises the steps of verifying the compatibility of data interfaces at which the signal transmission prerequisite is met, and generating of the behavior model such that a signal flow between the data interfaces at which the signal transmission prerequisite and compatibility are met is modeled in the simulation.

To plan and design an automation system, firstly CAD drawings of the components of the automation system are developed with the aid of the CAD application. This is generally always the first step which a designer with this task will perform. The invention is now based on the idea of defining in the CAD application spatial limits in the form of geometric scopes of application for the interfaces of the components of the automation system, within which the associated interface can pass on data and signals. These spatial areas may, for example, simulate the operation of a mechanical plug-in contact or, in contactless data transmission, e.g., by Radio Frequency Identification (RFID), the range of a transponder used for this purpose.

If the question now is whether the system in accordance with the invention or the behavior model to be developed herewith is to simulate a signal flow between two components of the automation system, then it is firstly checked whether scopes of application of interfaces of these components meet the signal transmission prerequisite. The signal transmission prerequisite defines the spatial position at which the scopes of application have to be arranged relative to each other to enable data communication to occur between the associated interfaces. For example, a data transmission prerequisite of an interface could state that a signal flow to another interface is possible only if the associated scopes of application completely overlap. Alternatively, a signal transmission prerequisite could stipulate that signal transmission is possible if the associated scopes of application at least partially overlap. Such a prerequisite would be conceivable, for example, in the case of wireless transmission technology, where a signal flow is possible as soon as the associated communication fields at least partially overlap. It is also conceivable for a signal transmission prerequisite to be defined such that signal transmission is possible only when the scopes of application involved do not overlap.

If the user positions two components of the automation system within the CAD environment such that the scopes of application of an interface of the one component and of an interface of the other component are located spatially relative to each other such that the signal transmission prerequisite is met, then a prerequisite necessary for the modeling of a signal flow between these two components over the interfaces is met. In addition, however, the system in accordance with the invention also verifies the compatibility of these two interfaces before a signal flow is modeled in the behavior model.

Consequently, the user of the system in accordance with the invention is able to model a signal flow between two components without having to draw connection lines for this purpose. This also avoids the problem of overlapping connection lines which lead to unclear signal flow diagrams. Compared with this, the modeling of signal flows in accordance with the invention is highly intuitive and offers a very clear representation even in large automation technology plants.

In addition, the simulation of signal flows with the aid of geometric scopes of application is very important during runtime. The type of behavior simulation in accordance with the invention ensures that only relevant signal flows are ever simulated. If, for example, during the simulation a displacement of two components of the automation system is modeled, as a result of which scopes of application which fulfilled the signal transmission prerequisite before the displacement no longer do so after the displacement, then the simulation of the signal flow which no longer exists thereafter is dropped. This is ensured by the fact that the system automatically recognizes that the signal transmission prerequisite is no longer met. Accordingly, computing time can be saved by this means, compared with simulation methods known from the prior art.

The data interfaces of components of the automation system generally differ in the case of real components between inputs and outputs, the components of the automation system being simulated in the simulation by corresponding program codes. Within these program codes, signals incoming at the inputs of the components are used for allocating variables. Input values calculated by the program codes are in turn written to the outputs of the components. Correspondingly, an embodiment of the invention in which the system comprises fifth means for defining a signal flow direction for each of the data interfaces, the fourth means being configured to take this into account in the modeling of the signal flow, is advantageous. The user is consequently able to declare the data interfaces of the components as inputs or outputs. The signal flow direction can also be taken into account in the compatibility verification, because the system can automatically recognize if the user erroneously fulfils the signal transmission prerequisite with two scopes of application which are, however, both inputs or both outputs. Here, the compatibility verification of the system would deliver a negative result.

In addition, however, further criteria can be used for verifying the compatibility of data interfaces. For example, in a further advantageous embodiment of the invention, the system comprises sixth means for the definition of a signal category for the data interface, which characterizes the category of the values which can be exchanged through the associated interface, and where the third means are configured for verifying the compatibility between the data interfaces based on the signal categories. Such a signal category may, for example, be a "position" category. In this way, the position, such as the position of a workpiece, can be transmitted from one component to another component of the automation system. Two data interfaces whose scopes of application meet the signal transmission prerequisite and which both belong to the "Positions" signal category would fulfill such a compatibility criterion.

A further criterion in the exchange of data which is used for further data processing by computer programs is the data type. Accordingly, an advantageous embodiment of the invention is provided such that the system comprises seventh means for the definition of a data type for values which can be exchanged through the data interfaces, and where the third means are configured for verifying the compatibility between the data interfaces on the basis of the data type.

In real automation systems, various technical embodiments of data interfaces are used. For example, data can be transmitted optically, electrically in a wire-bound manner or else wirelessly. It is, accordingly, advantageous to provide an embodiment of the invention in which the second means are configured for the definition of a signal transmission prerequisite for each scope of application. For line-bound signal transmission, in which the data transmission interfaces are embodied in the shape of plug-in connections, calls for a different signal transmission prerequisite from a wireless communication path.

If, on the other hand, in an automation system data interfaces of the same type are used throughout, then a simplified embodiment of the invention, in which the second means are configured for precisely defining one data transmission prerequisite for all scopes of application, may be considered advantageous. This reduces the declaration outlay for the user.

An automation system generally comprises a multiplicity of sensors and actuators which interact with each other and with workpieces to be processed in the automation system. In the generation of behavior models for such automation systems, sensor signals are nowadays normally generated as a function of predefined time intervals. An embodiment of the invention in which the system comprises eighth means for the definition, with the aid of the CAD drawing, of an interaction area for at least one component of the automation system, the interaction area specifying the geometric limits within which the associated component is active as a sensor or as an actuator, and where the fourth means are configured for linking the interaction area and the dimensions of workpieces drawn in the CAD application in the development of the behavior model such that, in the simulation of the automation system, a workpiece, upon entry into the interaction area, automatically triggers the simulation of the sensory or actuatory action of the component associated with the interaction area, represents a considerable simplification for the user.

In this embodiment, the sensor signals are no longer generated as a function of time intervals predefined by the user, but are event-controlled, i.e., for example, based on an event which can be traced back to the material flow within the automation technology plant. For this purpose, the user defines the interaction areas in a similar manner to the scopes of application directly within the CAD application. The maximum possible data consistency is achieved by this means, because the CAD data generated in the design of the automation system are also used for the development of the behavior model.

Thus, in this embodiment, the interaction area, in which one component of the automation system is active as a sensor or an actuator, is defined directly in the CAD drawing of the automation system. For a component embodied as an actuator, the interaction area here indicates the geometric limits within which the actuator can act. The interaction area therefore describes the geometric dimensions in which the actuator can, for example, take hold of a workpiece to change its position or alignment or else modify the shape of the workpiece through assembly operations or material-processing processes.

If, on the other hand, the component is a sensor, then the interaction area describes the volume covered by the sensor. As soon as a workpiece enters this interaction area, the sensor can, in an event-controlled manner, generate a corresponding input signal for the control program to be tested. Since the CAD drawing of the automation system already describes all the dimensions and therefore provides a suitable basis for the definition of geometric scopes of application and interaction areas, user convenience is increased considerably, particularly by the embodiment described. The system can thus provide the user even within the CAD application with the facility for also defining the dimensions of the workpiece. These dimensions have to be known for behavior simulation by means of such an embodiment since, with the aid of the dimensions and the geometric proportions of the interaction areas, it can be determined if or when a workpiece is located in an interaction area of a sensor or actuator.

As soon as the dimensions of the workpiece are located in the interaction area of a sensor or the actuation area of an actuator, a program code associated with the sensor or actuator is launched which simulates the corresponding functionality of the components. In this way, input and output signals can be simulated in an event-controlled manner within the behavior simulations. With such a system, complex automation systems can therefore be simulated very easily and also much more accurately than is possible with conventional behavior simulations in which sensor and actuator signals are simulated only time-dependently.

In a further advantageous embodiment of the invention, the second, third and fourth means and, if present, the fifth, sixth, seventh and eighth means, are integrated in an engineering system. Such an engineering system makes it possible to use the CAD data produced in an early planning phase also during simulation of the planned automation system and consequently enables maximum possible data consistency in the planning phase.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described and explained in greater detail below with the aid of the exemplary embodiments represented in the figures, in which.

DETAILED DESCRIPTION OF THE PREFERRED EMBODIMENTS

Figure 1:
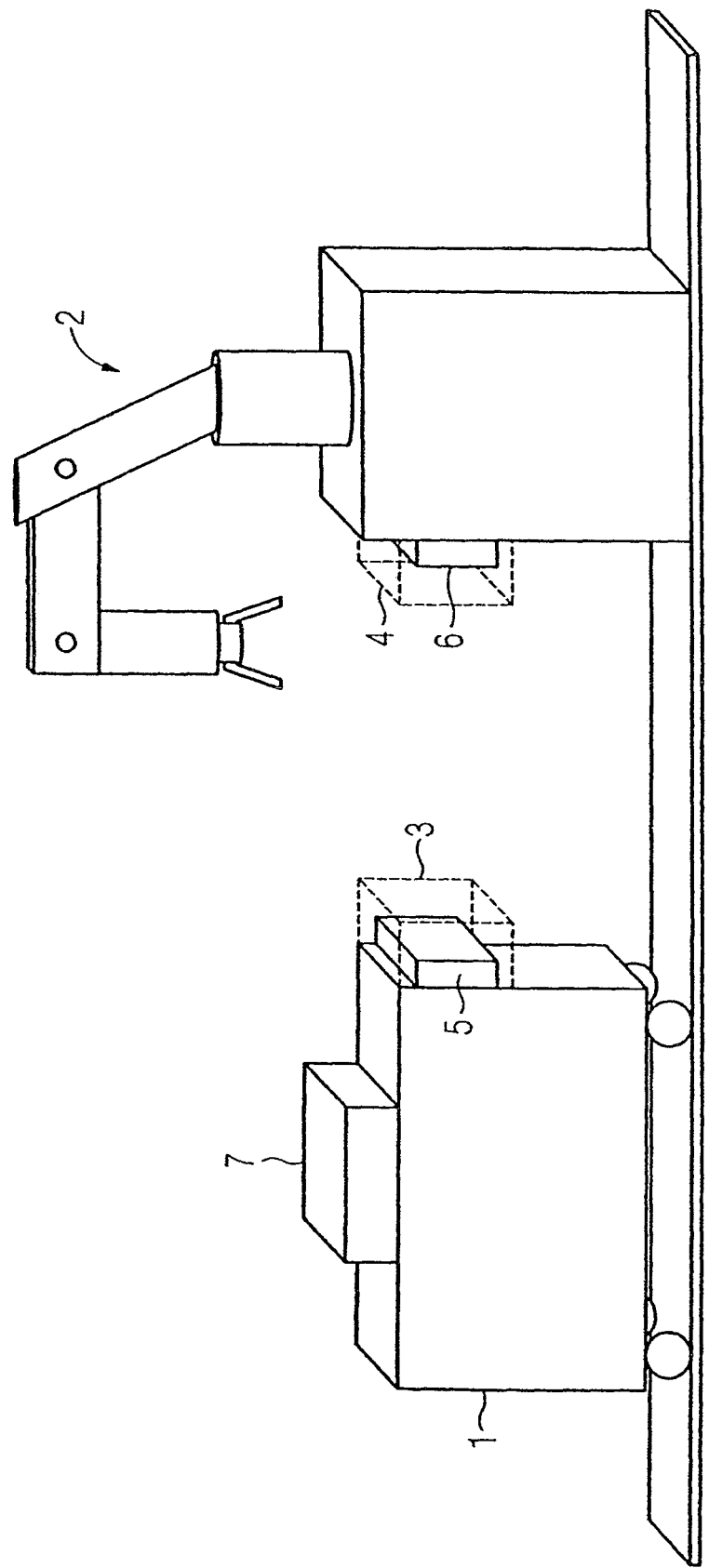
FIG. 1 shows a CAD drawing as a basis for generating a behavior model comprising a system having components with open data interfaces in accordance with an embodiment of the invention.

FIG. 1 shows a CAD drawing as a basis for generating a behavior model comprising a system in accordance with an embodiment of the invention, components 1,2 with open data interfaces 5,6 being represented. The drawing was developed with the aid of a CAD environment which is part of an extensive engineering system for the planning and designing automation systems. In the automation systems to be planned, workpieces 7 are moved on autonomous transport units, the figure showing by way of example the CAD representation of one of these transport units. Thus, a first component 1 of the automation system represents such a traveling transport unit which comprises a receptacle for a workpiece 7. A second component 2 of the automation system forms a processing station which is intended for processing the transported workpiece 7. The first component 1 transports the workpiece 7 during a production process to be simulated to the second component 2. The first component 1 contains a first interface 5, via which it can exchange data with a second interface 6 of the processing station as soon as the transport unit is located within communication range. When the transport unit has traveled sufficiently close to the processing station that communication between the data interfaces 5,6 is possible, signals and data about their own status and about the status of the workpiece 7 are exchanged with the control of the processing station. The control of the processing station then initiates the respective processing step.

The transport units have their own control with data memory, actuators and sensors for capturing and positioning workpieces 7. They also have their own actuators and sensors for implementing the traversing movements of the transport unit itself as well as the previously mentioned first data interface 5 for transmitting the data about the status of the transport unit and the workpiece 7. The first data interface 5 and the second data interface 6 communicate by means of RFID technology. Their range is spatially limited. Accordingly, the signals and data can be relayed only to a spatially restricted area. In order to make this information available to the system, the user defines within the CAD environment so-called scopes of application 3,4. Thus, the first data interface 5 is assigned a first scope of application 3 which specifies the spatially restricted area in which data communication is possible with a complementary RFID interface if a corresponding scope of application of this complementary RFID interface overlaps at least partially with the first scope of application 3.

Analogously, the second component 2 or its second interface 6 also has a second scope of application 4 which in a similar manner defines the restricted communication range of the associated second interface 6. In the example represented here, the transport unit is located too far away from the processing station for there to be an overlap in the scopes of application 3,4. A signal flow between the first and second component 1,2 is not therefore possible in the scenario represented here.

Once the user has completed the mechanical design of components 1,2 and has defined the scopes of application 3, 4 in the CAD environment, further planning and design for this equipment is performed with the aid of the engineering system. To this end, the CAD drawing shown is imported into the engineering system. The engineering system will now create for each automation technology element, i.e., for each of the components 1,2 in the example, a data object called a resource. So-called facets, which contain a list of signals, functional descriptions and control code fragments, are added to these resources. The signals are assigned signal categories, signal flow directions, data type, connection types and their names. Furthermore, these so-called resources are qualified with the elements in the CAD models which correspond to the corresponding object, possibly the active area of an actuator or the detection range of a sensor, and the scopes of application 3,4 of the signals in the CAD drawing. The scopes of application 3,4 of the signals are analyzed by an extension package of the engineering system to develop simulations of control programs. To this end, for each signal, information about its scope of application 3,4, the signal category, the direction of signal flow, the data type, the connection type and the name are relayed, along with the functional descriptions, to a target system intended for the simulation.

In the simulation, each resource is described by an element. These elements exhibit a behavior which corresponds to the functional description of the respective resource. This behavior is expressed in changes in the properties, interface parameters and spatial position of the element. The interface parameters correspond to the signals of the resources in the engineering system. This assignment is represented by designating the same names to the signals and the interface parameters in the functional descriptions. During the course of the simulation, the signals which have overlapping scopes of application 3,4 and identical signal categories, data types and connection types are linked. Between the linked signals, the respective data is exchanged in the direction of the specified signal flow. Such an exchange of signals occurs only if the scopes of application 3,4 overlap and thereby meet a valid signal transmission prerequisite.

Figure 2:
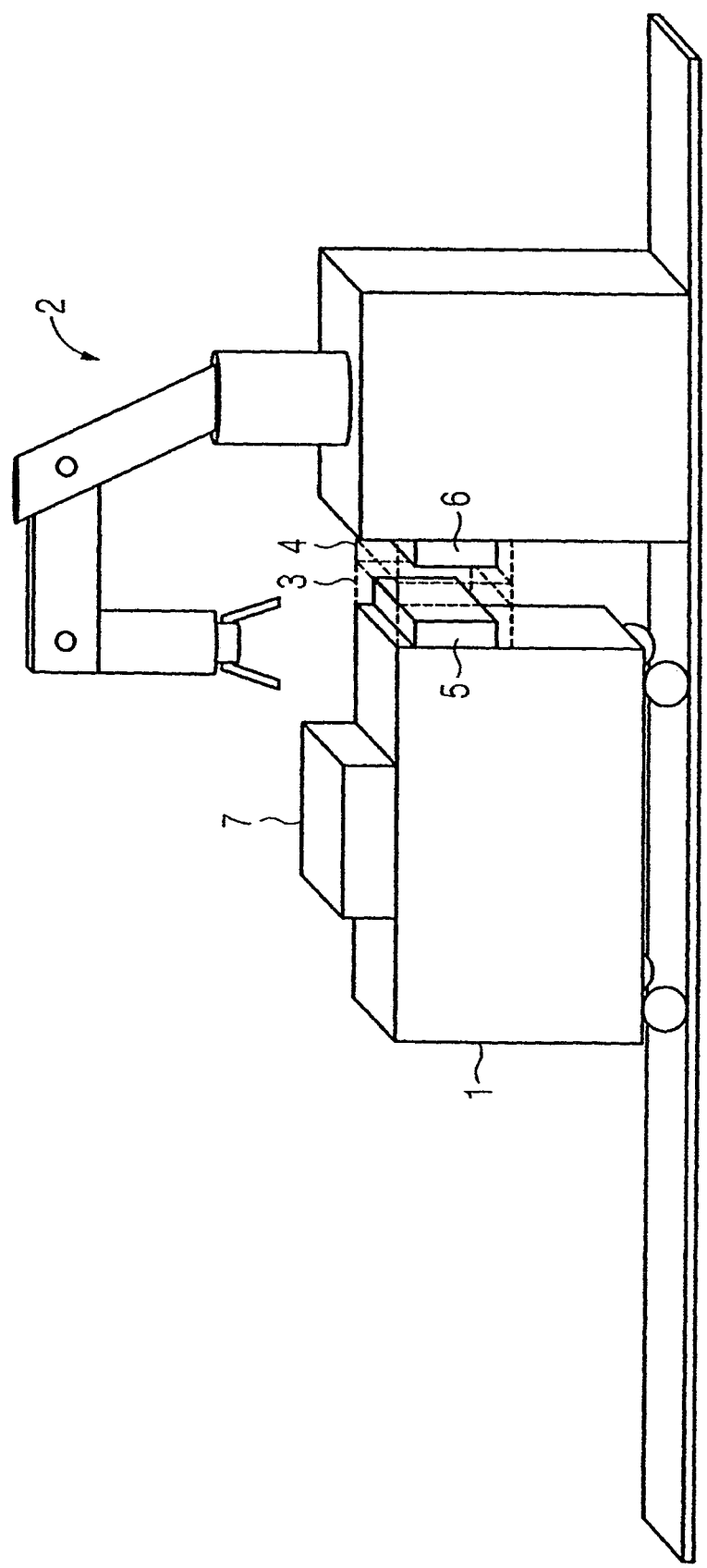
FIG. 2 shows the CAD drawing of FIG. 1, with a signal flow occurring between the components.

Such an exchange of signals is represented in FIG. 2, which shows the CAD drawing of FIG. 1, a signal flow occurring between the components 1,2, since the scopes of application 3,4 of the first and second data interfaces 5,6 now overlap. This overlap has occurred as the autonomous transport unit with the workpiece 7 has moved further toward the processing station. The engineering system now establishes both this overlap and thus the valid signal transmission prerequisite and the compatibility of the first data interface 5 with the second data interface 6. In accordance with the pre-designed signal flow direction, a data exchange now occurs between the transport unit and the processing station, data regarding the status of the transport unit and of the workpiece 7 transported by the transport unit being transmitted to a control program of the processing station.

Figure 3:
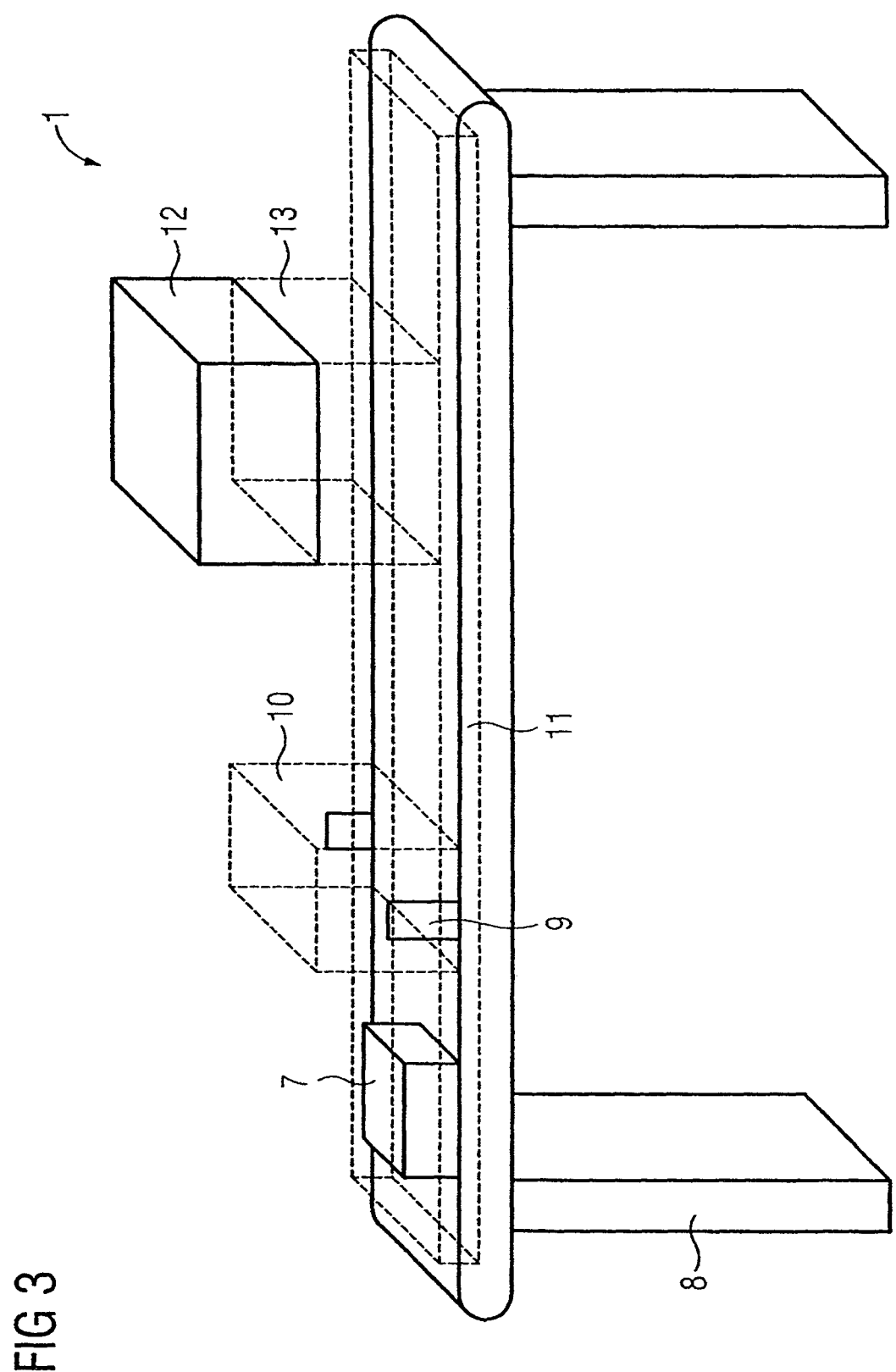
FIG. 3 shows a further CAD drawing as a basis for generating a behavior model comprising a system according to an embodiment of the invention.

FIG. 3 shows a further CAD drawing as a basis for generating a behavior model comprising a system in accordance with an embodiment of the invention. The CAD drawing shows an automation system and is imported into the engineering system to generate the behavior model for a simulation of the automation system. Since the aim at this point is merely to provide an explanation of the principle of an embodiment of the invention, a very simple automation system is shown here, comprising only a conveyor belt 8 on which workpieces 7 are transported which are detected by a sensor 9 and processed in some way by an actuator 12. The geometry of the conveyor belt 8, the sensor 9 and the actuator 12 has already been defined in advance in a CAD application. The CAD data has subsequently been imported into an engineering system.

Within the engineering system, interaction areas 10,11,13 can now be defined for the sensors 9 and actuators 12 of the automation system. A first interaction area 11 emerges, which specifies the active area of the conveyor belt 8. The interaction area 11 describes the geometric limits within which the conveyor belt 8, driven by a motor (not represented here), effects a translatory movement of workpieces 7 which are located in the active area 11.

The workpieces 7 are delivered to the conveyor belt 8 by an autonomous transport unit, also not represented here. This transport unit is communicatively connected by a data interface to the conveyor belt 8 as soon as it reaches the conveyor belt 8. The production of the signal flow occurs analogously to the procedure shown in FIGS. 1 and 2, whereby an overlap of the corresponding scopes of application is determined and the compatibility of the associated data interfaces is verified and affirmed.

If a model of the workpiece 7 is now located in the active area 11 of the conveyor belt 8, then its movement from left to right at the speed of the conveyor belt 8 is simulated automatically.

A detection range 10 of the sensor 9 is also defined within the imported CAD drawing. In turn, this detection range 10 specifies in the geometric limits within which the sensor 9 can detect the presence of workpieces 7. As soon as the workpiece 7 enters this detection range 10, the sensor 10 will send a binary signal to a control of the automation system. The emission of this signal is thus initiated in an event-controlled manner. A computer program code which simulates the behavior of the sensor 9 is started in the behavior simulation when an overlap of the geometric dimensions of the workpiece 7 and of the detection range 10 is detected.

During further transportation of the workpiece 7 on the conveyor belt 8, the workpiece 7 finally enters the active area 13 of the actuator 12. This interaction area which is likewise defined in the imported CAD drawing determines the geometric limits of the volume within which the actuator 12 can act upon the workpiece 7. Here, the computer program code which simulates the behavior of the actuator 12 is also executed in an event-controlled manner when a full or partial overlap of the dimensions of the workpiece 7 with the active area 13 of the actuator 12 is detected.

From the action and detection ranges designed in the CAD drawing and the modes of behavior linked to them, a behavior model is developed for a simulation system, by which model the behavior of the automation system, and of the control program which controls the automation system, is simulated. This model is developed automatically without the user intervention. Here, the simulation system accesses the geometric information from the CAD drawing to read in the interaction areas 10,11,13. The simulation checks automatically from the position of the workpiece 7 which interaction areas 10,11,12 are active and applies the actions defined in the form of a corresponding computer program code to the workpiece 7 or to the process image. Such a simulation can not only, as shown in the figure, change the position of the workpiece 7, but also modify internal states of the workpiece 7, such as weight and serial number. These internal states can in turn be read out by sensors.

Within the action range 13 of the actuator 12, physical rules on which the interaction of the actuator 12 with the workpiece 7 is based can also be simulated. Physical parameters such as inertia, torques, slippage and accelerations or collisions with their impacts and restrictions on movement for the workpieces 7 can be taken into account here. The physical variables needed for doing so can likewise be taken from the CAD drawing of the automation system or the drive control without the user having to perform any elaborate design for this purpose. For example, the affect of gravity can be taken into account within the simulation by defining a field of action covering the entire plant that imposes the force of gravity on the workpieces present in this field of action.

The invention makes it possible to link a control program to an equipment and material flow simulation. The control sequence and the completeness of the sensors and actuators can be verified by this means. A very realistic behavior model can be generated with relatively simple means using the methodology presented. This behavior model goes beyond a simple movement simulation. In this way, extreme simulations can also be simulated, such as an accumulation of workpieces upstream of a processing station, equipment behavior in the event of a fault or a failure of the sensors or actuators. Elaborate modeling of behavior in the form of algorithms can be dispensed with here. Instead, the plant planner can remain in his familiar CAD-dominated environment and generate realistic behavior models there.

Reprogramming of the dimensions and positioning of real objects is no longer necessary here. Also, no specific processing of the CAD data for the simulation occurs. The system automatically takes the data of the objects of the automation system from the CAD application. In this way, all the data about the plant is always used in a standard form and version for all applications. This ensures consistency and synchronization of the data over the entire product life cycle.

Figure 4:
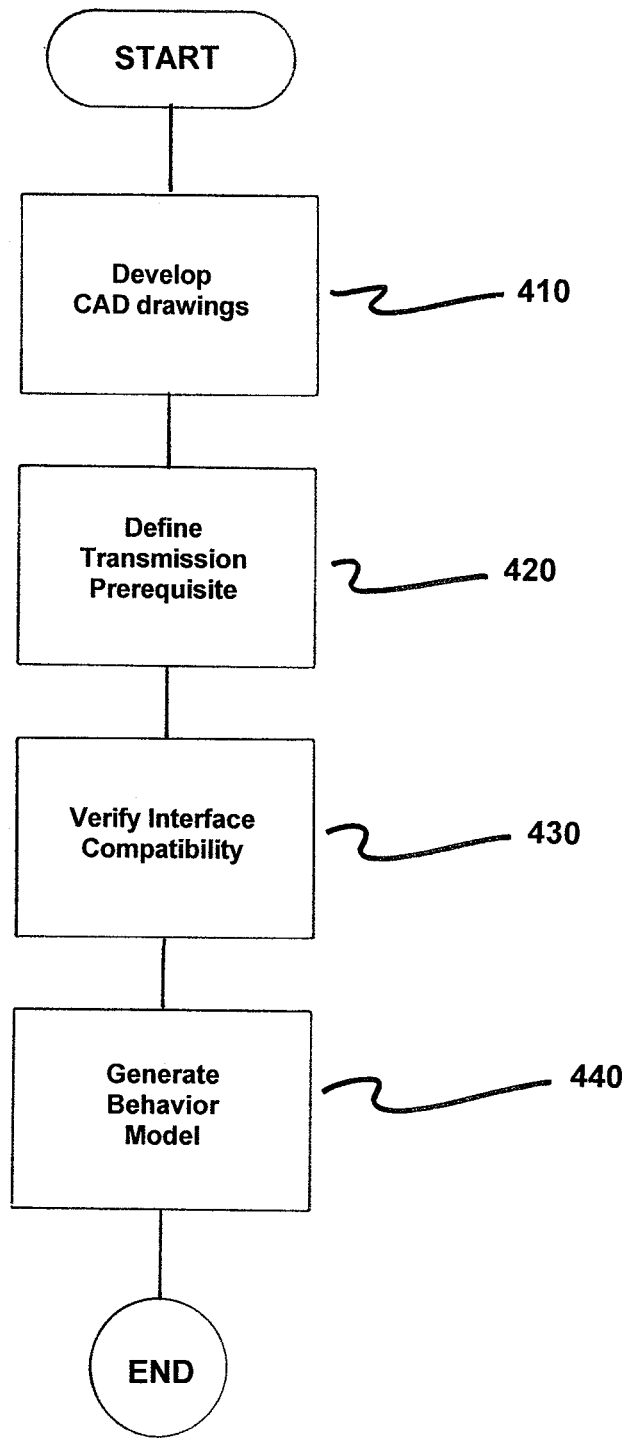
FIG. 4 is a flow chart illustrating the method in accordance with an embodiment of the invention.

FIG. 4 is a flow chart illustrating the method for simulating an automation system referring to the embodiment of FIGS. 1 and 2. The method comprises developing CAD drawings of components of the automation system in a CAD application, as indicated in step 410. Here, the CAD application provides a geometric scope of application 3,4 that is defined for data interfaces of the components 1,2. Next, at least one signal transmission prerequisite is defined, which marks at least one relative position of two scopes of application 3,4 relative to each other, at which signal transmission is possible between data interfaces which are associated with each other, as indicated in step 420. The compatibility of data interfaces at which the signal transmission prerequisite is met is verified, as indicated in step 430. The behavior model then generated such that a signal flow between the data interfaces 5,6 at which the at least one signal transmission prerequisite and compatibility are met is modeled in the simulation, as indicated in step 440.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for generating a behavior model for simulation of an automation system which is created and operated based on the generated behavior model comprising:
   a computer including at least one processor and memory storing instructions which, when executed by the at least processor, causes the computer to:
   develop CAD drawings of components of the automation system in a CAD application, the CAD application defining geometric scopes of application for data interfaces of the components, said geometric scopes comprising spatial limits in which the data interfaces become activated based on movement of a workpiece transported via a first component having a first wireless or optical data interface through open space of the automation system along a workflow path towards a second component having a second wireless or optical data interface such that data signals are passed between the first and second data wireless or optical data interfaces within the spatial limits in which the first and second wireless or optical data interfaces become activated;
   define at least one signal transmission prerequisite, which marks at least one relative position of two of the geometric scopes of application relative to each other, at which signal transmission is possible between associated ones of the data interfaces, which are associated with the two of the geometric scopes of application;
   verify compatibility of the associated data interfaces at which the signal transmission prerequisite is met; and
   generate the behavior model such that a signal flow between the associated data interfaces at which the signal transmission prerequisite and compatibility are met is modeled in the simulation;
   wherein the automation system is created and operated based on the generated behavior model in which the signal flow between the associated data interfaces at which the at least one signal transmission prerequisite and compatibility are met during the modelling in the simulation.

2. The system as claimed in claim 1, wherein a signal flow direction for the associated data interfaces; and
   wherein generation of the behavior model occurs during the modeling of the signal flow to consider the flow direction of the associated data interfaces.

3. The system as claimed in claim 2, wherein a signal category is defined for the associated data interfaces, the signal category marking the signal category of values which are exchangeable over the associated interfaces; and
   wherein compatibility between the associated data interfaces is verified based on the signal categories.

4. The system as claimed in claim 1, wherein a signal category is defined for the associated data interfaces, the signal category marking the signal category of values which are exchangeable over the associated interfaces; and
   wherein compatibility between the associated data interfaces is verified based on the signal categories.

5. The system as claimed in claim 1, wherein a data type is defined for values which are exchangeable over the associated data interfaces; and wherein compatibility between the associated data interfaces is verified based on the defined data type.

6. The system as claimed in claim 1, wherein a signal transmission prerequisite is defined for each of the geometric scopes of the application.

7. The system as claimed in claim 1, wherein precisely one signal transmission prerequisite is defined for all of the geometric scopes of the application.

8. The system as claimed in claim 1, wherein an interaction area is defined for at least one of the component of the automation system aided by the CAD drawing;
   wherein the interaction area specifies geometric limits within which the at least one of the components is active as one of a sensor and an actuator; and
   wherein said generate of the behavior model links the interaction area and dimensions of workpieces drawn in the CAD application during development of the behavior model such that, in the simulation of the automation system, upon entry into the interaction area, a workpiece automatically triggers the simulation of a sensory or an actuatory action of the at least one of the components associated with the interaction area.

9. The system as claimed in claim 1, wherein definition of the at least one signal transmission prerequisite, verification of a compatibility of the associated data interfaces and generation of the behavior model occurs in an engineering system.

10. A computer implemented method for generating a behavior model for simulating an automation system which is created and operated based on the generated behavior model, comprising the steps of:
   developing, by the computer, CAD drawings of components of the automation system in a CAD application, the CAD application providing geometric scopes of application is defined for data interfaces of the components, said geometric scopes comprising spatial limits in which the data interfaces become activated based on movement of a workpiece transported via a first component having a first wireless or optical interface through open space of the automation system along a workflow path towards a second component having a second wireless or optical interface such that data signals are passed between the first and second wireless or optical data interfaces within the spatial limits in which the first and second wireless or optical data interfaces become activated;
   defining, by a processor of the computer, at least one signal transmission prerequisite, which marks at least one relative position of two of the geometric scopes of application relative to each other, at which signal transmission is possible between associated ones of the data interfaces, which are associated with the two geometric scopes of application;
   verifying, by the processor of the computer, compatibility of associated data interfaces at which the signal transmission prerequisite is met;
   generating, by the computer, the behavior model such that a signal flow between the associated data interfaces at which the at least one signal transmission prerequisite and compatibility are met is modeled in the simulation; and
   creating and operating the automation system based on the generated behavior model in which the signal flow between the associated data interfaces at which the at least one signal transmission prerequisite and compatibility are met during the modelling in the simulation.

11. The method as claimed in claim 10, wherein a signal flow direction is defined for the associated data interfaces, which is taken into account during modeling of a signal flow.

12. The method as claimed in claim 10, wherein a signal category is defined for each of the associated data interfaces, the signal category marking a category of values which are exchangeable over the associated data interfaces, and wherein the compatibility between the associated data interfaces is verified based on the signal categories.

13. The method as claimed in claim 10, wherein a data type is defined for values which can be exchanged through the associated data interfaces; and
   wherein compatibility between the associated data interfaces is verified based on the data type.

14. The method as claimed in claim 10, wherein a signal transmission prerequisite is defined for each of the geometric scopes of application.

15. The method as claimed in claim 10, wherein precisely one signal transmission prerequisite is defined for all of the geometric scopes of applications.

16. The method as claimed in claim 10, further comprising:
   defining an interaction area for at least one of the components of the automation system aided by the CAD drawing;
   wherein the interaction area specifies geometric limits within which the at least one of the components is active as one of a sensor or an actuator; and
   wherein the interaction area and dimensions of workpieces drawn in the CAD application are linked to each other during development of the behavior model such that, in the simulation of the automation system, upon entry of a workpiece into the interaction area, a simulation of a sensory or an actuatory action of the at least one of the components associated with the interaction area is automatically triggered.

* * * * *